US007370660B2

(12) United States Patent
Hamilton et al.

(10) Patent No.: US 7,370,660 B2
(45) Date of Patent: May 13, 2008

(54) OXYGEN BOTTLE CARRIER APPLIANCE

(76) Inventors: Roger H. Hamilton, 114 Atkinson Ave., Syracuse, NY (US) 13207; Peter G. Jordan, 101 Atkinson Ave., Syracuse, NY (US) 13207

( * ) Notice: Subject to any disclaimer, the term of this patent is extended or adjusted under 35 U.S.C. 154(b) by 147 days.

(21) Appl. No.: 10/726,172

(22) Filed: Dec. 2, 2003

(65) Prior Publication Data

US 2004/0129305 A1 Jul. 8, 2004

Related U.S. Application Data

(63) Continuation-in-part of application No. 10/037,207, filed on Jan. 4, 2002, now Pat. No. 6,672,321.

(51) Int. Cl.
*A61H 3/04* (2006.01)
*B60R 9/06* (2006.01)

(52) U.S. Cl. ....................... 135/67; 135/66; 224/47.39; 224/407

(58) Field of Classification Search ............ 135/65–67, 135/85; 280/47.35, 304.1; 297/5, 188.02, 297/188.06; 224/407, 409, 42.38, 275, 572, 224/926, 42.39, 47.35; 248/215; 383/72, 383/61.4
See application file for complete search history.

(56) References Cited

U.S. PATENT DOCUMENTS

| | | | | | |
|---|---|---|---|---|---|
| 127,533 | A | * | 12/1916 | Gamble | 383/18 |
| 1,313,959 | A | | 8/1919 | Smith | |
| 3,358,789 | A | * | 12/1967 | Laun | 182/113 |
| 3,970,344 | A | | 7/1976 | Baumann | |
| 4,045,044 | A | | 8/1977 | Bierer | |
| 4,251,044 | A | | 2/1981 | Olson | |
| 4,266,765 | A | | 5/1981 | Sandoval et al. | |
| 4,312,505 | A | | 1/1982 | Engelhart | |
| 4,431,206 | A | | 2/1984 | Pryor | |
| 4,438,764 | A | * | 3/1984 | Eppolito | 128/205.22 |
| 4,506,903 | A | | 3/1985 | Bowermaster | |
| 4,577,903 | A | * | 3/1986 | Wells | 297/188.06 |
| 4,800,910 | A | | 1/1989 | Gamm | |
| 4,923,060 | A | * | 5/1990 | Breslau | 206/316.2 |
| 4,974,760 | A | | 12/1990 | Miller | |
| 5,012,963 | A | | 5/1991 | Rosenbaum | |
| 5,154,331 | A | * | 10/1992 | Sanders | 224/407 |
| 5,253,760 | A | | 10/1993 | Miller | |
| 5,259,372 | A | * | 11/1993 | Gross et al. | 128/200.24 |
| 5,288,001 | A | | 2/1994 | Locarno | |
| 5,465,884 | A | * | 11/1995 | Bohl et al. | 224/407 |
| 5,476,432 | A | | 12/1995 | Dickens | |
| 5,511,846 | A | * | 4/1996 | Fuller | 294/149 |
| 5,513,789 | A | | 5/1996 | Woods et al. | |
| 5,641,197 | A | * | 6/1997 | Springmann | 297/188.11 |
| 5,839,631 | A | * | 11/1998 | Hebert et al. | 224/251 |
| 5,871,183 | A | * | 2/1999 | Milluzzi | 248/96 |
| 5,951,716 | A | * | 9/1999 | Lucia et al. | 8/142 |
| 6,186,662 | B1 | * | 2/2001 | Jackson | 383/16 |
| 6,299,043 | B1 | * | 10/2001 | Griffin | 224/616 |
| 6,634,631 | B2 | * | 10/2003 | Hebert | 269/45 |

* cited by examiner

*Primary Examiner*—Winnie Yip
(74) *Attorney, Agent, or Firm*—Hiscock & Barclay, LLP

(57) ABSTRACT

A carrier for retaining an oxygen bottle said carrier comprising a flexible open-top container adapted for maintaining a close fitting relationship with an oxygen bottle, said container including an upper mouth portion made at least partially from a stiff material to enable an oxygen bottle to be loaded therein vertically; and a flexible upper bottle retaining portion, for preventing said bottle from falling out of said carrier.

7 Claims, 3 Drawing Sheets

OXYGEN BOTTLE CARRIER APPLIANCE

CROSS REFERENCE TO RELATED APPLICATION

This application is a continuation in part application of U.S. patent application Ser. No. 10/037,207, filed Jan. 4, 2002, now U.S. Pat. No. 6,672,321, the entire contents of which are herein incorporated by reference.

FIELD OF THE INVENTION

This invention relates generally to the field of oxygen bottle carrying apparatus, particularly for individuals who have difficulty breathing and, in particular, to an oxygen bottle carrier that can be attached for use to an orthopedic appliance, such as a walker or a wheelchair.

BACKGROUND OF THE INVENTION

Many patients and, in particular, elderly patients, have breathing disorders that necessitate the use of oxygen. In certain extreme cases, the patient must have oxygen for breathing available at all times and, in particular, when the patient is exerting him or herself, as for example, when walking. Oxygen bottle caddies on wheels are presently available for transporting oxygen bottles. However, these devices require the use of one of the patient's hands to propel the bottle, thus rending them impractical for use when the patient must also use a walker to get about. Attempts to mount an oxygen bottle upon a walker have been proven to be less than satisfactory because the bottle typically renders the walker unstable and extremely difficult to manage. This, in turn, can pose a dangerous situation for an elderly or weak patient which can lead to a potentially damaging fall.

Alternately, patients who cannot walk utilize wheelchairs to get from place to place. There are known oxygen bottle carriers that are designed specifically for use with such appliances, such as described in U.S. Pat. No. 5,288,001. However, there are associated problems with such carriers. For example, typically the extremely flexible fabric carrier sack must first be placed on the floor or other surface in a non-use position in order to push the oxygen bottle into the confines thereof. That is to say, it is extremely difficult, if not impossible for one person to load the bottle into the carrier in the use position on the wheelchair or walker. This is disadvantageous, particularly when attempting, for example, in trying to replace an empty bottle. In addition, there are also associated problems in attempting to attach the caddy to the wheelchair or other appliance in an effectively balanced manner. Still further, there are issues concerning whether the top of the bottle is effectively secured, for example, if the carrier were to fall, given the dangerous circumstances surrounding a pressurized oxygen bottle.

SUMMARY OF THE INVENTION

It is, therefore, a primary object of the present invention to improve oxygen bottle carriers in an effort to overcome the above-noted deficiences of the prior art.

It is a further primary object of the present invention to provide for the safety of patients who require the use of both oxygen and a walker or other appliance, such as a wheelchair, when moving from place to place.

It is a still further object of the present invention to mount an oxygen bottle upon a walker or other appliance in a stable condition that will not impede the user's ability to safely control the walker.

It is still a further object of the present invention to provide a carrier for an oxygen bottle that permits same to more effectively support an oxygen bottle in the instance the carrier should fall. In addition, the carrier, can preferably include convenient means for supporting additional items and storage.

These and other objects of the present invention are attained by a carrier for supporting an oxygen bottle, said carrier including an open-top flexible container having at least a pair of stabilizing straps are attached to the container, said straps being securable to lateral portions of said applicance to prevent the container and thus the oxygen bottle from moving out of the commonly shared frame with the wheels.

BRIEF DESCRIPTION OF THE DRAWING

For a better understanding of these and other objects of the present invention, reference will be made to the following detailed description of the invention which is to be read in association with the accompanying drawings wherein.

DETAILED DESCRIPTION OF THE INVENTION

The following discussion relates to certain preferred embodiments of an oxygen bottle carrier that is made in accordance with the present invention and used in conjunction with certain orthopedic applicances. It should be readily apparent that certain modifications and variations will be available to one of sufficient skill in the field, after consulting the teachings provided herein.

Figure 1:
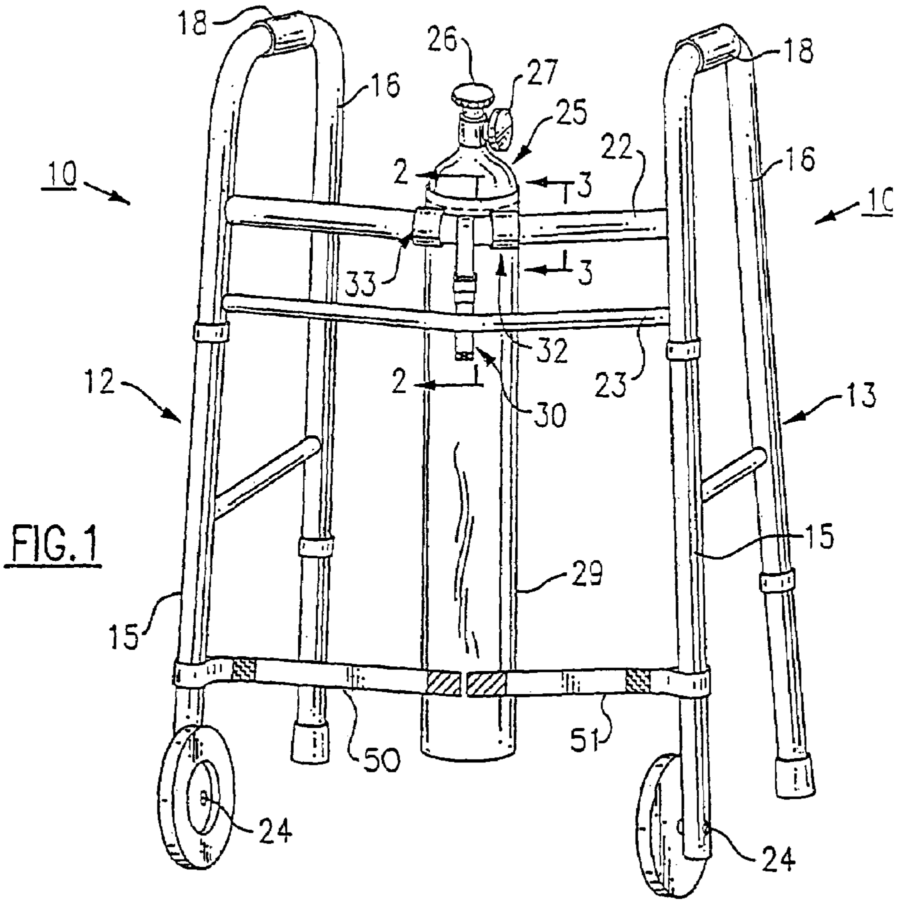
FIG. 1 is a front perspective view of a walker having an oxygen bottle carrier made in accordance with a first embodiment of the present invention.

With regard to the first embodiment, and turning now to FIG. 1, there is illustrated a walker, generally referenced 10, that includes an oxygen bottle carrier made in accordance with the present invention. The walker 10 is of typical construction and includes a pair of side frames 12 and 13. Each side frame 12, 13 is of similar construction and includes a vertically disposed front leg 15 and a vertically disposed rear bar 16. A horizontally disposed handrail 18 is integrally joined to the front and rear legs 15, 16 and provides a means by which a patient can securely grip and control the walker 10 when situated between the two side frames 12, 13. A lower rail 20 also extends between the front and rear legs 15, 16 of each side frame 12, 13 in order to provide additional strength to the walker 10.

The two side frames 12, 13 are supported in a spaced apart relationship by an upper cross member 22 and a lower cross member 23 that are secured between the two front legs 15 of the frame. The rear section of the walker 10 remains open so that a patient using the walker can pass in an unobstructed manner between the two side frames 12, 13. Each of the side frames 12, 13 is equipped with a wheel 21 that is rotatably supported upon a shaft 24 that is mounted in the lower part of the front leg 15. In assembly, the two shafts 24 and the two cross members 22, 23 lie close to or actually within a common vertical plane. The above construction defines the majority of walkers in general, whose construction in and of itself is acknowledged as well known in the field and not forming an essential part of the present invention.

Figure 4:
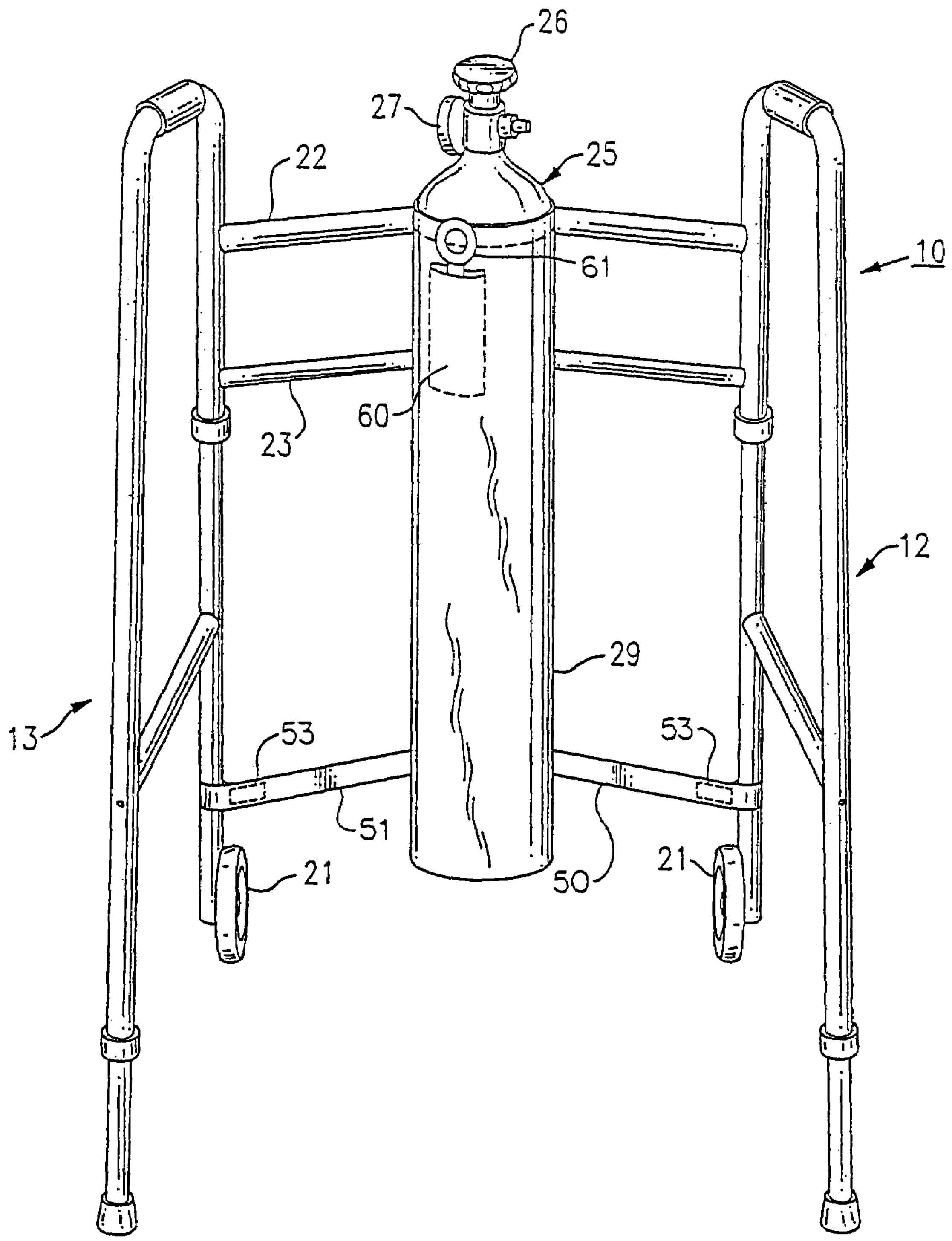
FIG. 4 is an enlarged rear perspective view of the walker and carrier of FIGS. 1-3.

A container, preferably in the form of an flexible open top bag 29, is suspended from the upper cross member 22 of the walker 10, as best illustrated in FIGS. 1 and 4. The flexible bag 29 is preferably made from a flexible fabric, such as polyester or other lightweight material, and is of a size and shape such that the bag can hold a standard size oxygen bottle 25 that is slidably inserted into the bag through a top opening thereof. A close sliding fit is provided between the bottle 25 and the bag 29 so that the bottle is snugly supported within the bag. Preferably, the upper mouth portion of the bag 29 includes an imbedded plastic-reinforced periphery, see also FIG. 7, that maintains a predetermined shape and has adequate stiffness to easily permit a bottle 25 to be fitted directly into the bag 29. The length of the bag 29, according to this embodiment, is such that the upper part of the oxygen bottle 25 protrudes through the top opening whereby the regulator 26 and gauges 27 that are associated with the bottle are exposed and thus are easily accessible to one using the walker 10.

Figure 3:
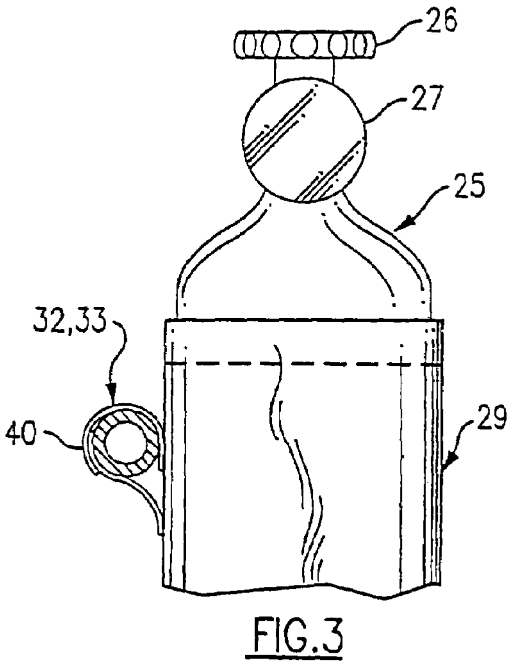
FIG. 3 is a further partial sectional view taken along lines 3-3 in FIG. 2.

The flexible bag 29 is suspended from the top cross member 22 of the walker 10 by two-piece hanger straps which include a center strap 30, and two smaller side straps 32 and 33 that are spaced to either side of the center strap. The two extreme ends of each strap are sewn into the bag 29 and the free ends of the straps are joined by releasable fasteners. In assembly, the flexible bag 29 is centered upon the upper cross member 22 between the two side frames 12, 13 and each of the side straps 32, 33 are looped over the cross member 22 and their free ends are tightly fastened together using a hoop and loop (e.g., Velcro) type fastener 40 as illustrated in FIG. 3. To pull the bag 29 securely against the cross member 22, the hook and loop fastener includes a hook pad that is sewn into one of the strap's free ends and an elongated loop pad that is sewn into the free end of the other strap.

Figure 2:
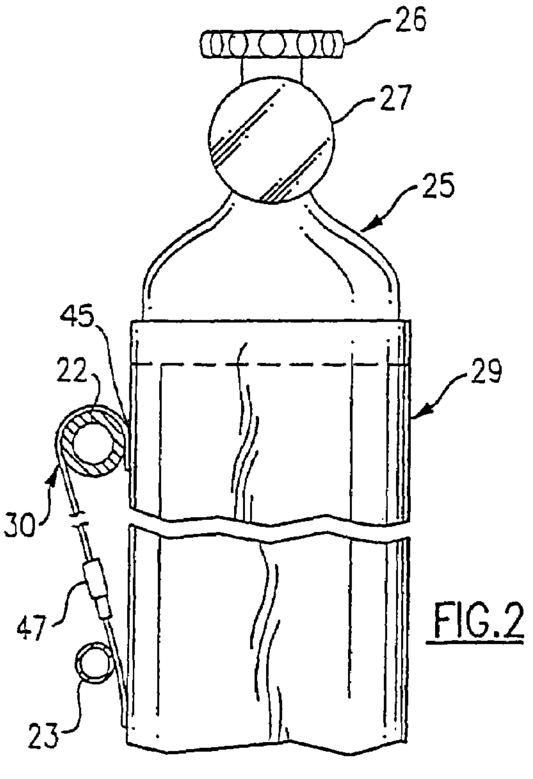
FIG. 2 is a partial sectional view taken along lines 2-2 in FIG. 1.

The two side straps 32, 33 are primarily used to hold the flexible bag 29 centered between the side frames 12, 13 and to stabilize the top section of the bag. The center strap 30, on the other hand, is designed to support the main weight of the bag 29 and a contained bottle 25. The center strap 30 contains a first top piece 45 that has one end sewn into the bag 29 so that the top piece can loop over the upper cross member 22, as illustrated in FIG. 2. The bottom piece of the center strap 30 has one end sewn into the bag 29 so that this end of the strap extends well below and behind the lower cross member 23 of the walker 10 when the top piece 45 is looped over the upper cross member 22. As illustrated in FIG. 2, the two free ends of the center strap 30 are cojoined by a heavy duty buckle 47. The strap parts 30 and the buckle 47 are fabricated of high strength materials, so that the strap is well able to support the container and the bottle 25 in an upright position upon the upper cross members 22.

The bottom section of the bag 29 is further stabilized by a pair of lower stabilizing straps 50 and 51. Each stabilizing strap 50, 51 has one end sewn into the lower part of the bag 29 and is of sufficient length so that the opposite ends of the strap can be looped around the lower part of one of the front legs of the walker as illustrated in FIGS. 1 and 4. Here again, hook and loop type fasteners 53 are employed to fasten the free end of each strap upon itself. Each fastener 53, for example, may have a hook pad sewn into the free end of the strap and an elongated loop pad sewn into a length of its body section so that the strap can be pulled taut and closed to hold the bag centered between the side frames.

As should now be evident, the bottle's center of gravity is located equidistance between the two side frames 12, 13 of the walker 10 and lies about or within the vertical plane of the wheel shafts 24. A patient (not shown) using the walker 10 needs simply to tip up the rear legs 16 of the walker about the axis of the wheels 21 and propel the walker in a forward direction. Because the center of gravity of the contained oxygen bottle 25 lies in a vertical plane that passes through or very close to the axis of the wheel 21, the walker 10 can be easily tipped and propelled forwardly without much more exertion than that produced by a walker that is not equipped with an oxygen bottle. It should be further noted that because the bottle 25 is stabilized in this centered position, there is no tendency of the walker 10 to tip from side to side and it can be safely turned around corners without tipping over.

As illustrated in FIG. 4, an open top pouch 60 is also sewn into the bag 29 about opposite the location of the strap fastener 30. One or more tools 61 associated with the oxygen bottle 25 can be conveniently stored in the pouch 60 so that they are readily available in the event some adjustment must be made to the regulator 26 and other parts of the oxygen system while the walker 10 is in use.

Figure 5:
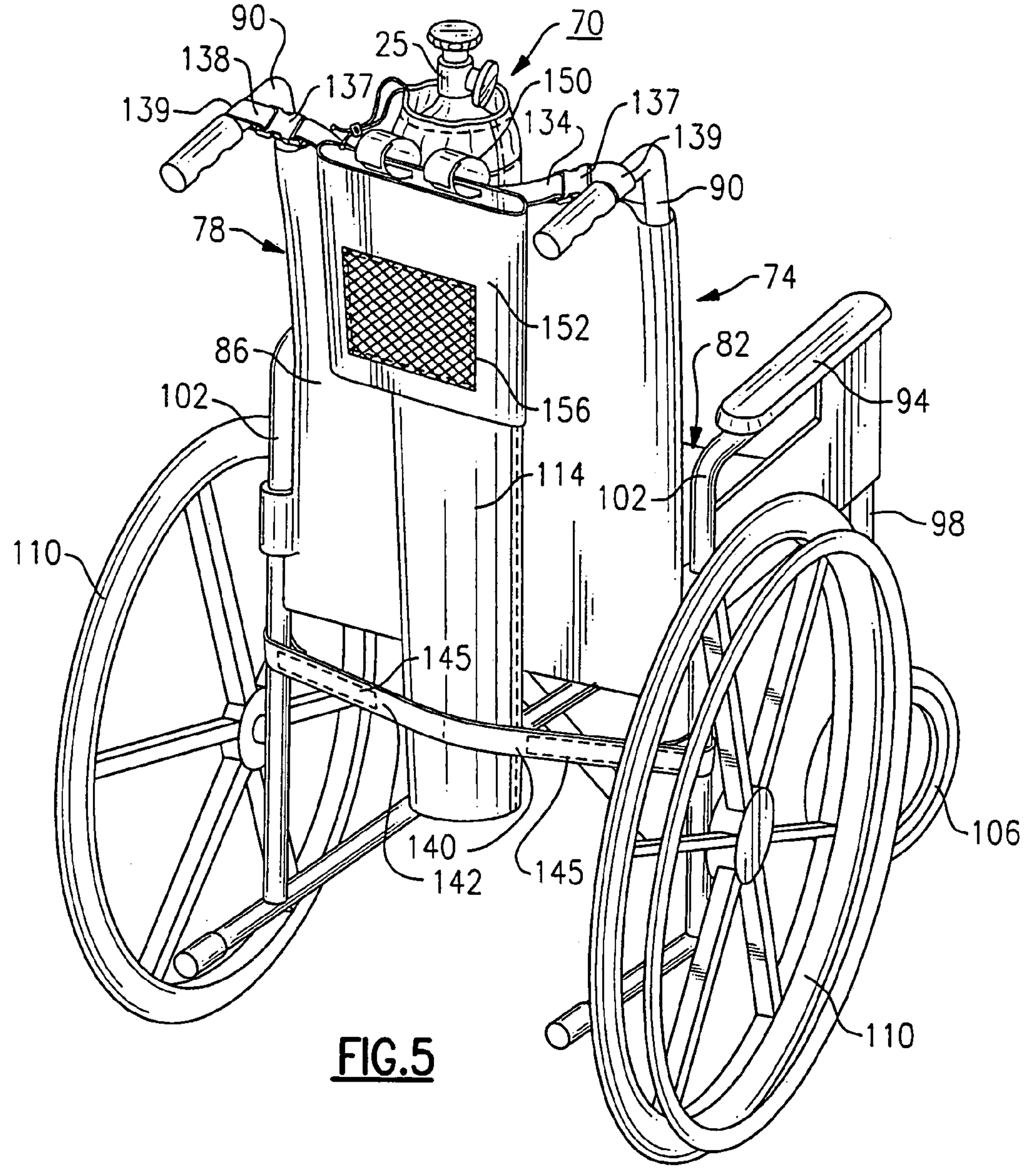
FIG. 5 is a rear perspective view of an oxygen bottle carrier made in accordance with a second preferred embodiment of the present invention, the carrier being used in conjunction with a wheelchair.
Figure 7:
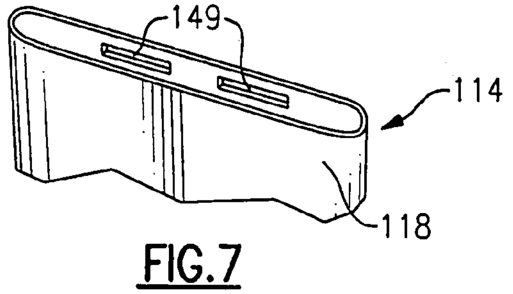
FIG. 7 is a partial enlarged top view of the carrier of FIGS. 5 and 6 with the upper retaining portion of the bag removed for purposes of clarity.
Figure 6:
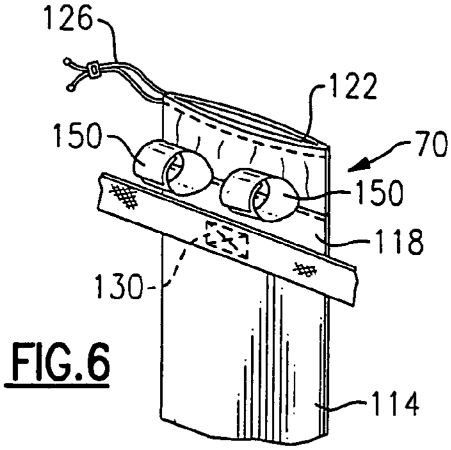
FIG. 6 is a partial top view of the oxygen bottle carrier of FIG. 5.

Referring now to FIGS. 5-7, there is described an oxygen bottle carrier 70 made in accordance with a second embodiment of the present invention. The carrier in this instance is uses in conjunction with a wheelchair 74 shown most particularly in FIG. 5, the wheel chair including a frame 78 that is defined by a seat 82 and a backrest 86. The frame 78 further includes a pair of spaced vertical handles 90 disposed on either side of the backrest 86 used for pushing the wheelchair 74, whereas the seat 82 includes armrests 94 and respective vertically extending front and rear legs 98, 102. The wheelchair 74 further includes a pair of swivelable front wheels 106 connected to a lower portion of the front legs 98 of the frame 78 as well as a pair of rear wheels 110 attached to the lower portion of each of the rear legs 102. The above construction defines the majority of wheelchairs in general, whose construction in and of itself is acknowledged as well known in the field and not forming an essential part of the present invention.

Referring to FIGS. 5 and 6, the carrier 70 is defined by a flexible bag 114 made preferably from a fabric such as polyester or other lightweight material and having a configuration that permits same to establish a close fitting relationship with a standard sized oxygen bottle, shown partially as 25. The bag 114 includes an upper mouth section 118 that includes a peripheral plastic reinforcement section, as more particularly shown at least partially in FIG. 7. The purpose of this section 118 is to provide certain stiffness and rigidity in initially accommodating an oxygen bottle 25 (not shown in FIG. 7), wherein the bottle can easily be loaded by one person while the carrier is attached to the appliance, whether a walker or wheelchair, for example.

Still referring to FIGS. 5 and 6, the flexible bag 114 defining the carrier 70 further includes a flexible bottle retaining section 122 directly above the upper mouth section 118 made from a fabric, such as nylon, polyester or other lightweight material and including a drawstring 126 in order to tighten the section once a bottle 25 has been successfully accommodated into the bag 114. The above section 122 is sewn, according to this embodiment, to the upper periphery of the upper mouth section 118 of the bag 114. It should be readily apparent, however, that other forms of flexible sections can be attached through various means such as zippers, clips, and the like. The flexible covering section can also be alternately made from a transparent material and can cover the regulator and gauges, but provide needed access to the oxygen line directly.

The carrier 70 further includes separate upper and lower retaining means for retaining the bag to each of the vertical handles 90 of the wheelchair behind the backrest 86. The upper retaining means includes a strap 130 sewn or otherwise attached, either permanently or removably, to the bag 114 and including respective ends 134 and 138. Each of the ends 134, 138 of the strap 130 include a buckle 137 and a respective strap section 139, wherein the entire length of the strap can be adjusted at either end, each of the strap sections being wrappable about a portion of the handle 90.

The bottom section of the bag 114 is further stabilized by a pair of lower stabilizing straps 140, 142. Each stabilizing strap 140, 142 has one end sewn into the lower part of the bag 114 and is of sufficient length so that the opposite ends of the strap can be looped around the lower part of one of the rear legs 102 of the wheelchair 74. Preferably, hook and loop type fasteners 145 are employed to fasten the free end of each strap 140, 142 upon itself. Each fastener 145, for example, may have a hook pad sewn into the free end of the strap 140, 142 and an elongated loop pad sewn into a length of its body section so that the strap can be pulled taut and closed to hold the bag 114 centered between the rear legs 102 of the wheelchair 74.

Finally, the upper mouth section 118 of the bag 114 includes a pair of slots 149, FIG. 7, used to accommodate a pair of straps 150 that retain an outer basket 152 that can be used for storage of items. The basket 152 can further include at least one exterior pocket 156.

PARTS LIST FOR FIGS. 1-7

10 walker
12 side frame
13 side frame
15 front leg
16 rear leg
18 handrail
20 lower rail
21 wheels
22 upper cross member
23 lower cross member
24 wheel shafts
25 oxygen bottle
26 regulator
27 gauges
29 flexible bag
30 center strap
32 side strap
33 side strap
45 top piece
47 buckle
50 stabilizing strap
51 stabilizing strap
53 fasteners, hoop and loop
60 pouch
61 tool
70 carrier

74 wheelchair
78 wheelchair frame
82 seat
86 backrest
90 handles
94 armrests
98 front legs
102 rear leags
106 front wheels
110 rear wheels
114 bag
118 upper mouth section
122 flexible retaining section
126 drawstring
130 strap
134 strap end
137 buckle
138 strap end
139 strap section
140 stabilizing strap
142 stabilizing strap
145 hook and loop-type fasteners
149 slots
150 basket straps
152 outer basket
156 exterior pocket While the present invention has been particularly shown and described with reference to the preferred mode as illustrated in the drawing, it will be understood by one skilled in the art that various changes in detail may be effected therein without departing from the spirit and scope of the invention as defined by the claims. For example, the basket attachment described in the wheelchair embodiment can easily be utilized in a walker-type carrier as well. In addition, it should be apparent that the herein described carrier can be used with other appliances and that, for example, other pockets can be formed on the flexible bag other than a tool pouch.

In addition, the preceding embodiments each supported a specifically sized oxygen bottle though it should be apparent that type "D" and "E" bottles, among others, can be supported. Moreover, the present carrier can be configured to accommodate different or varying lengths of bottles using the identical supporting details to attach to the various orthopedic appliances but include means within the bottle to define various sized compartments or enclosures to properly accommodate a given bottle. Such means can include belts, strips, hook and loop fasteners, as well as flaps, among others.

We claim:

1. In combination, a flexible open-top container that maintains a close fitting relationship with an oxygen bottle placed therein, said oxygen bottle comprising a substantially cylindrical housing including at least one regulator and gauge extending from an upper portion of said housing, said container including:

a sleeve portion that retains said oxygen bottle;

a peripheral mouth portion;

an internal rigid plastic peripheral section directly adjacent said peripheral mouth portion that maintains a predetermined shape and size in an open configuration and provides stiffness to said mouth portion and wherein said mouth portion is sized to permit ingress of the substantially cylindrical housing of said oxygen bottle, thereby enabling said oxygen bottle to be loaded into the container vertically by one person loading said bottle, said at least one regulator and gauge extending outwardly therefrom and wherein said peripheral mouth portion is made from a flexible material and includes closure means for preventing said retained oxygen bottle from falling out of said container;

a pair of upper strap ends extending from respective sides of the peripheral mouth portion of said container, said pair of upper strap ends including a snap-fitting buckle portion at one strap end of each of said pair, wherein the other strap end of said upper strap pair is adapted to be looped around a portion of an upper support portion of an orthopedic appliance and is attached to the other of said upper strap end pair via an adjustable and releasable buckle connection; and a pair of lower straps, each of said lower straps including an attached elongated hook or loop pad, and a strap end extending from opposite sides of the lower portion of said flexible open-top container, each of said strap ends including a hook or loop fastener wherein each of said lower straps is adapted to be selectively looped around a lower support portion of an orthopedic appliance and fastened upon itself using said strap end and said hook or loop pad attached to said lower strap, said pairs of upper strap ends and said pair of lower straps enabling said flexible open-top container to be selectively adjustable both laterally and vertically when attached to an orthopedic appliance.

2. The combination as recited in claim 1, including means for retaining personal items of a person using said container.

3. The combination as recited in claim 2, wherein said personal item retaining means includes at least one basket attached to said container.

4. The combination as recited in claim 3, wherein at least one said basket is releasably attached.

5. The combination as recited in claim 1, wherein said closure means includes a drawstring to selectively reduce the diameter of said peripheral mouth portion.

6. The combination as recited in claim 1, wherein said container can be selectively attached to at least one orthopedic appliance, including at least one of a wheelchair and a walker.

7. The combination as recited in claim 1, wherein said container is attachable to a wheelchair.

* * * * *